United States Patent [19]

Stokes, Jr. et al.

[11] Patent Number: 5,222,318
[45] Date of Patent: Jun. 29, 1993

[54] TURTLE EXCLUSION DEVICE

[76] Inventors: Wilton C. Stokes, Jr.; Albert F. Stokes, both of Rte. 1, Box 42, Hilliard, Fla. 32046

[21] Appl. No.: 678,141

[22] Filed: Apr. 1, 1991

[51] Int. Cl.⁵ ............................................. A01K 73/02
[52] U.S. Cl. ................................................... 43/9.2
[58] Field of Search ............... 43/9.2, 100, 9.1, 9.7, 43/9.9, 101, 104

[56] References Cited

U.S. PATENT DOCUMENTS

| | | | |
|---|---|---|---|
| 3,015,903 | 1/1962 | Willingham | 43/9 |
| 3,440,752 | 4/1969 | Minter | 43/6.5 |
| 4,043,068 | 8/1977 | Savoie | 43/9 |
| 4,402,154 | 9/1983 | Pence | 43/9 |
| 4,739,574 | 4/1988 | Saunders | 43/9 |
| 4,805,335 | 2/1989 | West et al. | 43/9 |
| 5,076,000 | 12/1991 | Anthony | 43/9.2 |

Primary Examiner—Richard K. Seidel
Assistant Examiner—Chuck Y. Mah
Attorney, Agent, or Firm—Steven R. Scott

[57] ABSTRACT

A turtle exclusion apparatus for inclusion in shrimp trawling nets which features a turtle exclusion grate having bowed vertical bars and an "overhang" at its base and may also feature, when in combination with a net section in which it is contained, an opening by which fish may escape from the trawling net.

13 Claims, 3 Drawing Sheets

TURTLE EXCLUSION DEVICE

BACKGROUND OF THE INVENTION

1. Field of the Invention

This invention relates generally to shrimping nets and other equipment designed for shrimp trawling in the open sea. More specifically, it describes an improved Turtle Exclusion Device ("TED") or TED section for inclusion in a trawling net designed to capture shrimp.

2. Description of Prior Art

According to current practice, shrimp trawling nets consist of very large forward portions which taper (as one moves away from the vessel towing the net) to a comparatively narrow opening. At this opening there is affixed a comparatively narrow cylindrical section of net (generally referred to as the "cod," "bag" or "sock") which is open at its forward end to receive the catch funnelled into it by the forward portion of the net, and closed at its opposite end to trap marine life that enters. Turtle exclusion devices are generally disposed at the juncture of the forward portion of the net and the opening to the "cod." Alternatively, they may be in a generally cylindrical section of net included at this juncture for the purpose of holding portions of the turtle exclusion device in proper spaced relation to themselves and other portions of the shrimp trawling nets.

Representative examples of prior art in this area may be seen in U.S. Pat. Nos. 3,015,903; 3,440,752; 4,043,068; 4,402,154; 4,739,574; 4,805,335; and 4,869,010. U.S. Patent No. 3,015,903 issued to H. P. Willingham in 1962 illustrates several possible changes over prior art in the area of shrimp trawling nets and equipment. However, the portion of said patent most relevant to the innovations discussed herein are related to FIG. 7 which is described as a "novel trash rejection construction incorporated in the net bag." This "construction" features a rectangular bottom frame across which is suspended a piece of canvas having a longitudinal slit. An inclined grate having curved vertical bars is positioned over the bottom frame with its upper edge forward of its lower edge. As the net and grate move through the water, objects too large to move through the bars are forced downward toward the canvas suspended across the bottom frame and, according to the inventor, are eliminated from the net by effecting a passage through the slit in said canvas.

The use of an inclined grate having parallel bars or members to force objects too large to pass through away from and out of the opening to the cod or bag of the net is very common and is seen in one form or another in many of the other patents reviewed. It is also common for said grate to be placed with its members or bars parallel to the direction in which the rejected material is to be forced. Thus, where rejected material is to be directed upward or downward, the parallel members forming the grate are vertical. Likewise, if rejected material is to be forced to the side, the parallel members forming the grate are horizontal.

More complex examples of the art in this area are seen in the Trawl Net System patented by J. H. Minter in 1969 (U.S. Pat. No. 3,440,752) and the methods and apparatus for classifying marine items patented by Pence in 1983 (U.S. Pat. No. 4,402,154). The Trawl Net System, includes, among its other features, a "junction box" provided with a grate allowing certain types of sea life passing through to be captured. Undesired marine life forms purportedly pass through a resilient gate or are ejected from the junction box by a wiper engaging the grill. The Pence patent describes a box like mechanism for separating marine life having a side-to-side grate inclined toward one side. A flexible barrier is positioned on the side to which larger items are directed, allowing same to escape from the net.

More in keeping with the current art in this area are, however, the Turtle Excluder Device (U.S. Pat. No. 4,739,574) and the Apparatus for Exclusion of Debris from Bottom Trawls patented by Saunders (U.S. Pat. No. 4,869,010). The Turtle Exclusion Device patented by Saunders features an inclined vertical grate with its leading edge at the bottom and with a hinged turtle escape door at the top of the assembly. The apparatus described in U.S. Pat. No. 4,869,010 is basically identical to the Turtle Exclusion Device previously described except that it is disposed so that its vertical grate is inclined with its leading edge at the top and with its hinged gate located at the bottom. Examples of current art in this area may also be found at 50 C.F.R. §227.72 which describes "qualified turtle excluder devices."

SUMMARY AND OBJECTS OF THE INVENTION

Most of the Turtle Exclusion Devices in current use have serious drawbacks. One of the most important of these drawbacks is their tendency to become clogged with seaweed and other similar debris. As even a cursory review of the previously described examples of prior art will show, the primary component of almost every turtle exclusion device is an inclined grate featuring parallel bars or rods supported by a circular or rectangular frame, and sometimes by a cross-bar or cross-bars. Unfortunately, this configuration has the natural tendency to trap debris and weed around the bars, which gradually accumulates until it blocks and diverts water moving toward the grate. Water and shrimp, being unable to move through the grate by the accumulated debris, are diverted out of the net and escape. (This is the most important complaint most shrimpers have with Turtle Exclusion Devices). Second, if the grate is open, fish and other marine life small enough to pass through may become trapped with shrimp in the cod of the net. The instant invention offers improvements, in its most preferred embodiments, in both areas. It provides an improved grate that does not accumulate seaweed and other debris, and it provides an upper gap or opening for the escape of fish and other marine life from the cod.

The first improvement eliminates the cross-bar and the bottom of the supporting frame as points where seaweed will be caught while maintaining the overall strength of the TED. This is accomplished by: (a) "Bowing" (or curving) the vertical rods making up the TED grate for additional strength, allowing the elimination of cross-bars, or the substitution of a small upper cross-bar in their place; and (b) providing an "overhang" in the vertical rods making up the grate so that weed and debris slide off rather than accumulating at the bottom of the grate. The second improvement is accomplished by the addition of a gap or opening at the top of the net which allows fish to escape from the cod end of the net.

DETAILED DESCRIPTION OF THE PREFERRED EMBODIMENT

Figures 1, 2, 3:
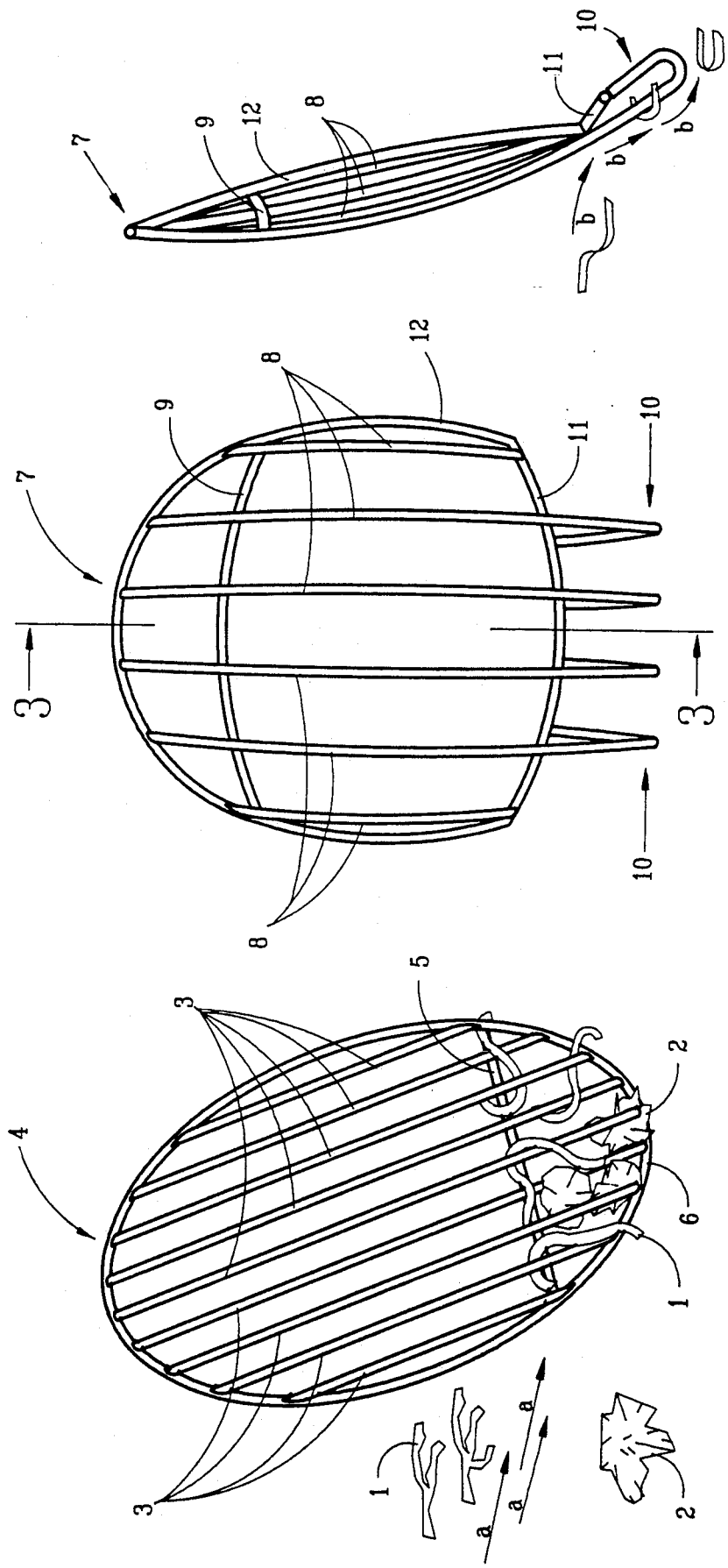
FIG. 1 provides a perspective view of a grate similar to those utilized in most turtle exclusion devices.
FIG. 2 provides a view from the front of an improved grate of the type utilized in the instant invention.
FIG. 3 provides a cross-sectional view of the improved grate utilized in the instant invention taken along the line 3—3 of FIG. 2.

FIG. 1 provides a suitable introduction to the primary improvement to existing turtle exclusion devices taught in the instant invention. Its purpose is, therefore, illustrative in nature. It graphically demonstrates how seaweed 1, and other debris 2 tends to wrap around the longitudinal members 3 of a typical turtle exclusion grate 4 and became trapped therein. When seaweed 1 and other debris 2 contact the grate 4 they tend to slide down the longitudinal members 3 due to the angle of the longitudinal members 3 and the pressure of the current (denoted by arrows "a") generated by the movement of the net and turtle exclusion grate 4 through the water. They are then trapped by a cross-bar 5 or the bottom of the supporting frame 6 of the grate 4. This problem is exacerbated by the fact that most shrimp trawling takes place at or near the bottom, where weed, trash and other debris is most common. As weeds, trash and other debris accumulates, it gradually blocks the turtle exclusion grate 4, preventing the entry of shrimp into the cod end of the net and/or deflecting and diverting the water (bearing its shrimp) out of the exit provided in the net for sea turtles.

An improved turtle exclusion grate 7 of the type utilized in this invention, as illustrated from the front in FIG. 2 and from the side in FIG. 3, features parallel longitudinal members 8, which are held in proper spaced relationship by their connection, at their upper end, to a generally horizontal upper support member 25, and at their lower end by their connection to a generally horizontal lower support member 11. It avoids the problem of trash and debris accumulation in two ingenious ways. First, the longitudinal members 8 of the grate 7 are "bowed" or curved for added strength. This allows the use of cross-bars (one of the primary points where debris accumulates) to be minimized. In the example illustrated, only one crossbar 9 has been provided near the top of the grate 7, where it is less likely to trap debris. Second, it features an overhang 10 at its bottom. The overhang 10, as graphically illustrated in FIG. 3 (a cross-sectional view of an improved turtle exclusion grate 7 of the type utilized in this invention) does not trap seaweed and other debris. It slides down the improved longitudinal members 8 utilized in this invention in the same manner discussed in relation to FIG. 1; however, instead of becoming trapped by lower support member 11 of the improved turtle exclusion grate 7, it simply slides off (as illustrated by arrows "b" in FIG. 3).

As with the examples of prior art previously discussed, the orientation of the turtle exclusion grate 7 could be easily changed so as to divert matter too large to pass through upward or to either side rather than downward. However, the arrangement illustrated is advantageous for two reasons. First, because many of the items to be diverted by the turtle exclusion grate 7 have negative rather than neutral or positive buoyancy. Thus, the force of gravity, as well as the pressure of moving water and the inclination of the grate 7, assist in moving them out of the net. Second, the overhang 10, as illustrated most clearly in FIG. 4, creates, in its more exaggerated embodiments, a series of parallel "runners" at the bottom of the turtle exclusion grate 7. These assist the grate 7 and the rest of the turtle exclusion device section 19 to slide, sled-like, across the bottom and simultaneously reduce the chances that they will become trapped or caught in traversing uneven or obstruction laden surfaces.

Figure 4:
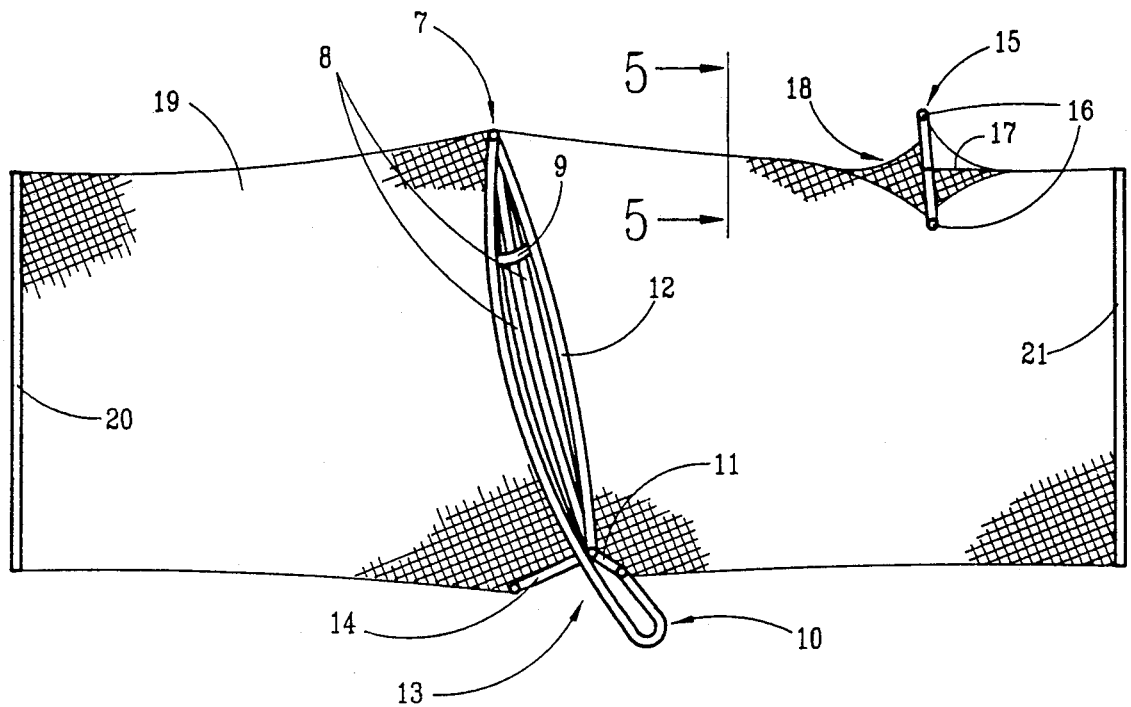
FIG. 4 provides a side view of the TED section containing an improved grate and fish escape means of the types utilized in this invention.

As seen in FIG. 4, the turtle exclusion grate 7, and the gap 18 provided for the escape of small fish from the net, may be advantageously incorporated in a turtle exclusion device section 19 formed from netting. This serves to hold the different components of the turtle exclusion device in proper spaced relation to themselves and the other components of the shrimp trawling net. The turtle exclusion device section 19 may be provided with a metal ring 20 at its forward end and a metal ring 21 at its aft end to serve as means to connect section 19 to, respectively, the forward portion of the shrimp trawling net and the "cod" portion of the shrimp trawling net. Further, as shown in FIGS. 2, 3 and 4, the upper support member 25 and the lower support member 11 may be advantageously incorporated into a supporting frame 12 which is generally circular or oval shaped.

Figure 5:
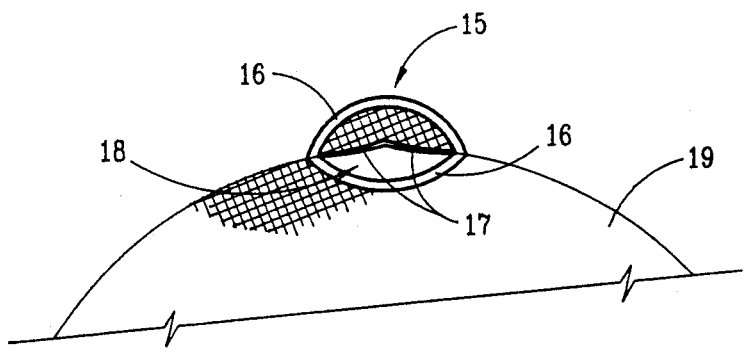
FIG. 5 provides a view of the fish escape means taken along the line 5—5 of FIG. 4.

The gap 18 may be advantageously formed with an oblong or oval shape as illustrated in FIG. 5 where it is shown formed from two arcuate members 16. As the netting of the turtle exclusion device section 19 is attached to the lower of the two arcuate members 16, shrimp are diverted below and past the gap 18 into the cod portion of the shrimp trawling net. Fish, being stronger swimmers than shrimp, are generally able to swim against the current generated by movement of the shrimp trawling net through the water, and escape via the gap 18. Turtles, and other objects and sea creatures too large to fit between the longitudinal members 8 of the turtle exclusion grate 7, are diverted downward in the manner previously explained toward the escape opening 13 provided in the bottom of turtle exclusion device section 19. The escape opening 13 is formed between the horizontal members 8 of the grate 7 and an arcuate element 14 to which the netting of the turtle exclusion device section 19 is joined. The arcuate element 14 may be formed from rigid or flexible materials using techniques well known in this art area.

The turtle exclusion grate 7 and other rigid portions of this invention may be advantageously formed from ⅜ inch or 7/16 inch mild steel bar. However, it could also be formed from any rigid material resistant to corrosion in sea water, such as aluminum, PVC, fiberglass, or hardened steel. The turtle exclusion grate 7 may be advantageously formed with a height of 45 inches and a diameter of 32 inches. The turtle exclusion devise section 19 may be advantageously produced in a length of 10 to 12 feet using techniques well known in this art area. The distance the overhang 10 extends below the lower support member 11 when the turtle exclusion grate 7 is mounted at its optimum working angle, inclined 30-45 degrees from the horizontal, may vary widely, and prototypes where this distance was less than 1 inch and those where it was up to 9 inches have been tested successfully.

Figure 7:
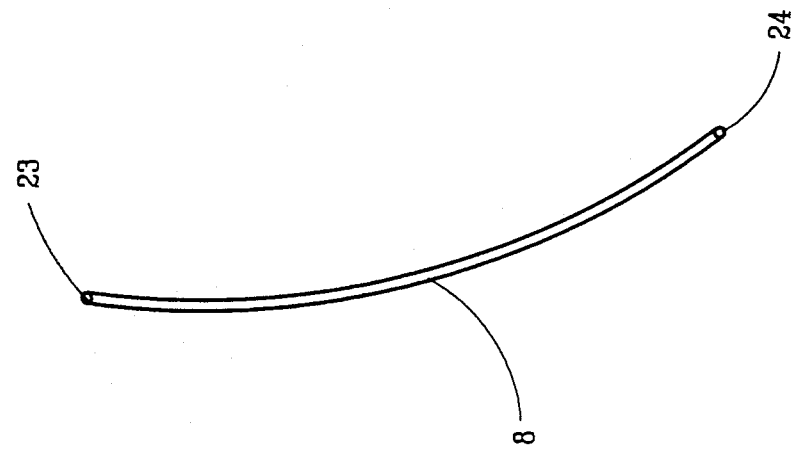
FIG. 7 provides a cross-sectional view of an insert for use with the improved grate utilized in this invention taken along the line 7—7 of FIG. 6.
Figure 6:
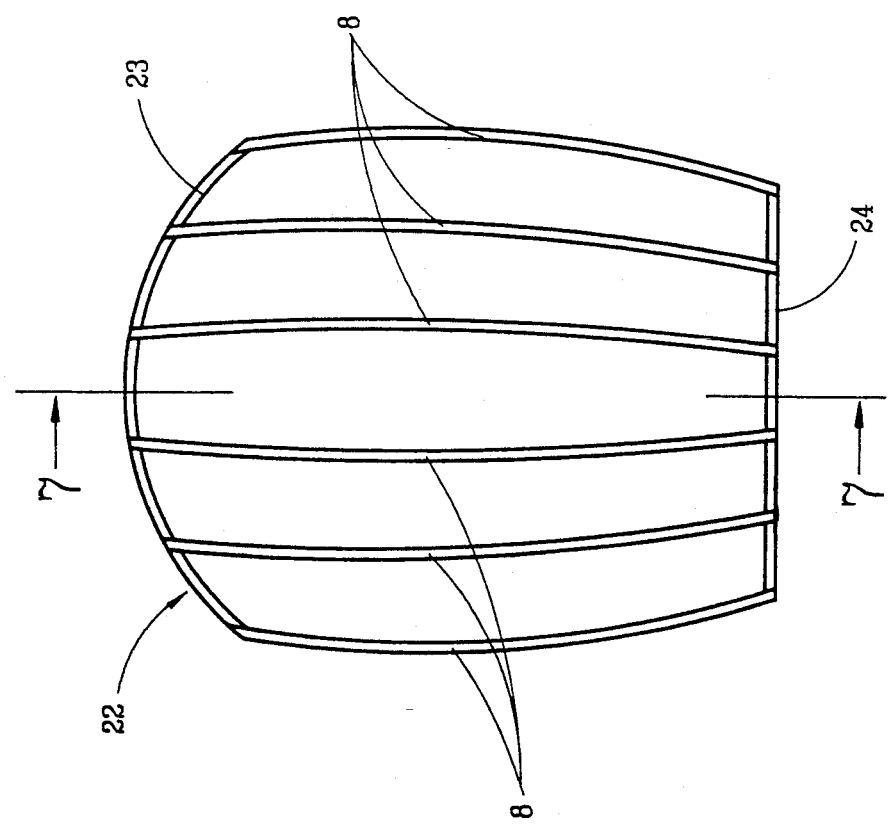
FIG. 6 provides a view from the front of an insert for use with the improved grate utilized in this invention.

To operate effectively, the longitudinal members 8 should be approximately 3 to 4 inches apart (the smaller distance between bars is particularly useful in excluding jelly fish). These distances will produce a turtle exclusion grate with 9 to 7 longitudinal members. To adjust to the changing conditions and needs of the locale an insert 22 with a greater number or differently spaced longitudinal members 8 as illustrated in FIGS. 6 and 7 may be provided. The base 24 of the insert 22 (which has an overall curve and dimensions generally mirroring those of the turtle exclusion grate 7) may be inserted into the overhang 10 prior to trawling operations. Even without further attachment, when firmly nested in this position, generally parallel to and behind the turtle exclusion grate 7, it has operated effectively in trials. It can, of course, also be stabilized in this position by being fastened with rope, wire, or in some other manner to the turtle exclusion grate 7.

We claim:

1. A turtle exclusion grate for inclusion in a trawling net, comprising:
   (a) a generally horizontal upper support member;
   (b) a generally horizontal lower support member which is disposed aft the upper support member when the turtle exclusion grate is positioned in use; and
   (c) a plurality of generally vertical longitudinal members disposed in a generally parallel array which are joined at their upper end to said upper support member and extend downward from said upper support member at such an angle as to remain generally forward of the lower support member while remaining generally aft the upper support member when the turtle exclusion grate is positioned in use until they are below the lower support member before being bent so as to meet said lower support member and be joined thereto.

2. A turtle exclusion grate for inclusion in a trawling net as set forth in claim 1, wherein the plurality of generally vertical longitudinal members are bowed forward of said lower support member.

3. A turtle exclusion grate for inclusion in a trawling net as set forth in claim 1, wherein a crossbar, located in the upper one-third of the grate, extends across, and is joined to, the generally vertical longitudinal members.

4. A turtle exclusion grate for inclusion in a trawling net as set forth in claim 3, wherein said crossbar is arcuate.

5. A turtle exclusion grate for inclusion in a trawling net as set forth in claim 1, wherein the upper support member and the lower support member are connected in such manner that they form the upper and lower portion, respectively, of a supporting frame for the generally vertical longitudinal members.

6. A turtle exclusion grate for inclusion in a trawling net as set forth in claim 1, wherein the upper support member and the lower support member are substantially arcuate, with the upper support member being convex upward and the lower support member being convex downward.

7. A turtle exclusion device with exclusion grate resistant to debris accumulation, comprising:
   (a) a generally cylindrical net section having a forward end which is open and attached to the forward section of a trawling net and an aft end which is open and attached to a cod of a trawling net, such that the generally cylindrical net section forms a tube of netting with an open interior when connected between the forward section of a trawling net and the cod of a trawling net;
   (b) a turtle exclusion grate disposed within the open interior of said generally cylindrical net section having an upper support member which is attached to said generally cylindrical net section, a lower support member which is attached to said generally cylindrical net section so as to be aft said upper support member, and a plurality of generally vertical longitudinal members disposed in generally parallel array which are joined at their upper end to said upper support member and extend downward from said upper support member at such an angle as to remain generally forward of the lower support member while remaining generally aft the upper support member when the turtle exclusion grate is positioned in use until they are below the lower support member before being bent so as to meet said lower support member and be joined thereto; and
   (c) an escape means in the netting forming said generally cylindrical net section located adjacent to the lower support member and extending therefrom in the forward direction.

8. A turtle exclusion device with turtle exclusion grate resistant to debris accumulation, as described in claim 7, wherein the plurality of generally vertical members are bowed forward of said lower support member.

9. A turtle exclusion device with turtle exclusion grate resistant to debris accumulation, as described in claim 7, wherein a crossbar, located in the upper one-third of the grate, extends across, and is joined to, the generally vertical members.

10. A turtle exclusion device with turtle exclusion grate resistant to debris accumulation, as described in claim 9, where said crossbar is arcuate.

11. A turtle exclusion device with turtle exclusion grate resistant to debris accumulation, as described in claim 7, wherein the upper support member and the lower support member are connected in such manner that they form the upper and lower portion, respectively, of a supporting frame for the generally vertical longitudinal members.

12. A turtle exclusion device with turtle exclusion grate resistant to debris accumulation, as described in claim 7, wherein the upper support member and the lower support member are substantially arcuate with the upper support member being convex upward and the lower support member being convex downward.

13. A turtle exclusion device with turtle exclusion grate resistant to debris accumulation, as described in any one of claims 7, 8, 9, 11 and 12 further comprising a means for releasing fish therefrom located in the upper part of the generally cylindrical net section between the turtle exclusion grate and the aft end thereof.

* * * * *